United States Patent
Tsukada et al.

(10) Patent No.: US 11,859,600 B2
(45) Date of Patent: Jan. 2, 2024

(54) LIQUID FEED PUMP AND LIQUID CHROMATOGRAPHY DEVICE

(71) Applicant: HITACHI HIGH-TECH CORPORATION, Tokyo (JP)

(72) Inventors: Nobuhiro Tsukada, Tokyo (JP); Daisuke Akieda, Tokyo (JP); Shinya Ito, Tokyo (JP); Kenichiro Nishiki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 363 days.

(21) Appl. No.: 17/427,754

(22) PCT Filed: Dec. 3, 2019

(86) PCT No.: PCT/JP2019/047141
§ 371 (c)(1),
(2) Date: Feb. 7, 2022

(87) PCT Pub. No.: WO2020/179160
PCT Pub. Date: Sep. 10, 2020

(65) Prior Publication Data
US 2022/0205440 A1    Jun. 30, 2022

(30) Foreign Application Priority Data
Mar. 1, 2019    (JP) ................. 2019-037516

(51) Int. Cl.
*F04B 1/34* (2006.01)
*F04B 23/06* (2006.01)
(Continued)

(52) U.S. Cl.
CPC ............. *F04B 1/34* (2013.01); *F04B 1/02* (2013.01); *F04B 23/06* (2013.01); *F04B 49/02* (2013.01);
(Continued)

(58) Field of Classification Search
CPC .... F04B 1/34; F04B 1/02; F04B 23/06; F04B 49/02; F04B 49/12; F04B 2201/0201;
(Continued)

(56) References Cited

U.S. PATENT DOCUMENTS 4,883,409 A * 11/1989 Strohmeier ......... F04B 11/0058
417/43
5,823,747 A * 10/1998 Ciavarini ................ F04B 53/06
210/101

(Continued)

FOREIGN PATENT DOCUMENTS

| JP | 2003-293946 A | 10/2003 |
| JP | 2004-137974 A | 5/2004 |
| JP | 2007-057539 A | 3/2007 |

OTHER PUBLICATIONS

International Search Report of PCT/JP2019/047141 dated Feb. 10, 2020.

(Continued)

*Primary Examiner* — Bryan M Lettman
(74) *Attorney, Agent, or Firm* — Mattingly & Malur, PC

(57) ABSTRACT

A liquid feed pump which increases the liquid flow velocity in a stagnation area in the pressure chamber of a plunger pump, thereby improving the liquid replacement speed in the plunger pump. When the liquid in the liquid feed pump is replaced, a first plunger slides back and forth in the space between a lower limit point and an upper limit point, and the second plunger stops at least temporarily at a position near to the upper limit point or slides back and forth for a shorter distance than when the liquid feed pump usually feeds the liquid.

12 Claims, 12 Drawing Sheets

(51) Int. Cl.
*F04B 49/02* (2006.01)
*F04B 1/02* (2006.01)
*F04B 49/12* (2006.01)
*G01N 30/32* (2006.01)

(52) U.S. Cl.
CPC ............. *F04B 49/12* (2013.01); *G01N 30/32* (2013.01); *F04B 2201/0201* (2013.01); *F04B 2201/0206* (2013.01); *G01N 2030/326* (2013.01)

(58) Field of Classification Search
CPC . F04B 2201/0206; F04B 13/00; G01N 30/32; G01N 2030/326; G01N 2030/328
See application file for complete search history.

(56) References Cited

U.S. PATENT DOCUMENTS

| | | | | |
|---|---|---|---|---|
| 7,063,513 | B2* | 6/2006 | Hiraku | F04B 11/0083 |
| | | | | 417/245 |
| 8,123,496 | B2* | 2/2012 | Ishii | G01N 30/32 |
| | | | | 417/20 |
| 2004/0164013 | A1* | 8/2004 | Takao | F04B 11/0075 |
| | | | | 210/101 |
| 2005/0023205 | A1* | 2/2005 | Hiraku | F04B 11/0058 |
| | | | | 210/258 |
| 2005/0061722 | A1* | 3/2005 | Takao | G01N 30/32 |
| | | | | 417/5 |
| 2005/0095145 | A1 | 5/2005 | Hiraku et al. | |
| 2012/0128533 | A1* | 5/2012 | Deguchi | F04B 23/06 |
| | | | | 422/62 |
| 2013/0104631 | A1* | 5/2013 | Tokuo | F04B 23/06 |
| | | | | 73/61.56 |
| 2013/0327692 | A1* | 12/2013 | Brann | G01M 3/2815 |
| | | | | 73/714 |
| 2013/0336803 | A1* | 12/2013 | Ruegenberg | F04B 49/20 |
| | | | | 417/12 |
| 2014/0318224 | A1* | 10/2014 | Onoda | G01N 30/32 |
| | | | | 137/565.15 |
| 2020/0182235 | A1* | 6/2020 | Yanagibayashi | F04B 1/02 |
| 2020/0240960 | A1* | 7/2020 | Song | G01N 30/32 |
| 2020/0386721 | A1* | 12/2020 | Sievers-Engler | F04B 49/08 |

OTHER PUBLICATIONS

Chinese Office Action received in corresponding Chinese Application No. 201980090575.8 dated Jul. 25, 2022.

* cited by examiner

LIQUID FEED PUMP AND LIQUID CHROMATOGRAPHY DEVICE

TECHNICAL FIELD

The present invention relates to a liquid feed pump which sucks or discharges a liquid.

BACKGROUND ART

In analysis using liquid chromatography, the solvent to be used is different depending on the type of a sample as the object of measurement, so the solvent in a liquid feed pump must be replaced before analysis of each sample. Therefore, in order to conduct a lot of analyses of various samples in a given period of time, it is necessary to replace the solvent in a short time.

The undermentioned Patent Literature 1 describes a pump for liquid chromatography. The literature has an object to "provide a pump for liquid chromatography which is excellent in stable liquid feed at an ultra-low flow rate and bubble discharge ability at start-up" and discloses a technique that "at start-up a large volume of liquid is fed by a first plunger 2 to discharge the bubbles in the pump and fill a solvent in a short time and at the time of steady operation the first plunger 2 is stopped and a second plunger 3 is pushed into a second pressure chamber 13 at low velocity to feed the liquid at a low flow rate; a controller 50 controls so that in synchronization with when the second plunger 3 is pulled back at high velocity upon reaching the full stroke, the first plunger 2 is pushed into the first pressure chamber 12 to ensure that the flow rate passing through a discharge path 11 is always constant" (see the abstract).

The undermentioned Patent Literature 2 has an object to "provide a liquid chromatography device which can shorten the pump start-up time" and discloses a technique that "a liquid chromatography device in this invention includes a first and a second pump with a plunger, a suction port and a discharge port and discharges the liquid sucked through the suction port from the discharge port through the first and second pumps; in a start-up operation mode, the second pump is stopped and only the first pump is operated; when discharge pressure at the discharge port reaches a prescribed value, the start-up operation mode is changed to a steady operation mode; in the steady operation mode, the first pump is stopped and only the second pump is operated" (see the abstract).

CITATION LIST

Patent Literature

Patent Literature 1: Japanese Patent Application Laid-Open No. 2004-137974
Patent Literature 2: Japanese Patent Application Laid-Open No. 2007-057539

SUMMARY OF INVENTION

Technical Problem

A liquid feed pump which is generally used in liquid chromatography has a structure in which a plurality of plunger pumps to feed a solvent by movement of a plunger in a pressure chamber are connected in series and has a stagnation area in the pressure chamber where the solvent is hardly replaced. For example, in an area in the vicinity of a seal for sealing between the plunger pump main body and the plunger, the solvent flow velocity tends to go down. The existence of such a stagnation area slows down solvent replacement, resulting in a decline in analysis throughput.

Patent Literature 1 describes a bubble discharge process in the pump at start-up and the like. For example, in FIG. 3 of the literature, for the bubble discharge process at start-up, the first plunger is slid back and forth and the second plunger is fixed at the bottom dead point. However, this process is performed at start-up, and the solvent replacement speed is not improved after operation is started. Therefore, it is difficult to solve the problem that the solvent replacement speed is slow in the stagnation area.

Patent Literature 2 also describes a bubble discharge process in the pump at start-up and the like. For example, in FIG. 3 of the literature, as a bubble discharge and eluant filling mode at start-up, the first plunger and the second plunger slide back and forth alternately. In addition, in a start-up operation mode after the gas discharge and eluant filling mode, the second plunger is fixed at the bottom dead point and the first plunger is forced to make discharging motion. According to the literature, discharge of bubbles and quick start-up are intended by these processes. However, these processes are performed at start-up and after operation is started, the solvent replacement speed is not improved. Therefore, like Patent Literature 1, it is difficult to solve the problem that solvent replacement is slow in the stagnation area.

The present invention has been made in view of the above problem and has an object to improve the liquid replacement speed in a plunger pump by increasing the liquid flow velocity in a stagnation area in a pressure chamber of a plunger pump.

Solution to Problem

In the present invention, when the liquid in a liquid feed pump is replaced, the first plunger slides back and forth in a space between a lower limit point and an upper limit point, and the second plunger at least temporarily stops near the upper limit point or slides back and forth for a shorter distance than when the liquid feed pump usually feeds the liquid.

Advantageous Effects of Invention

According to the liquid feed pump according to the present invention, the time to replace the solvent in the liquid feed pump can be shortened. Consequently, the number of analyses in a given time can be increased. In addition, since the plunger almost stops during solvent replacement, the load on the seal is small and its life can be lengthened.

DESCRIPTION OF EMBODIMENTS

First Embodiment

Figure 1:
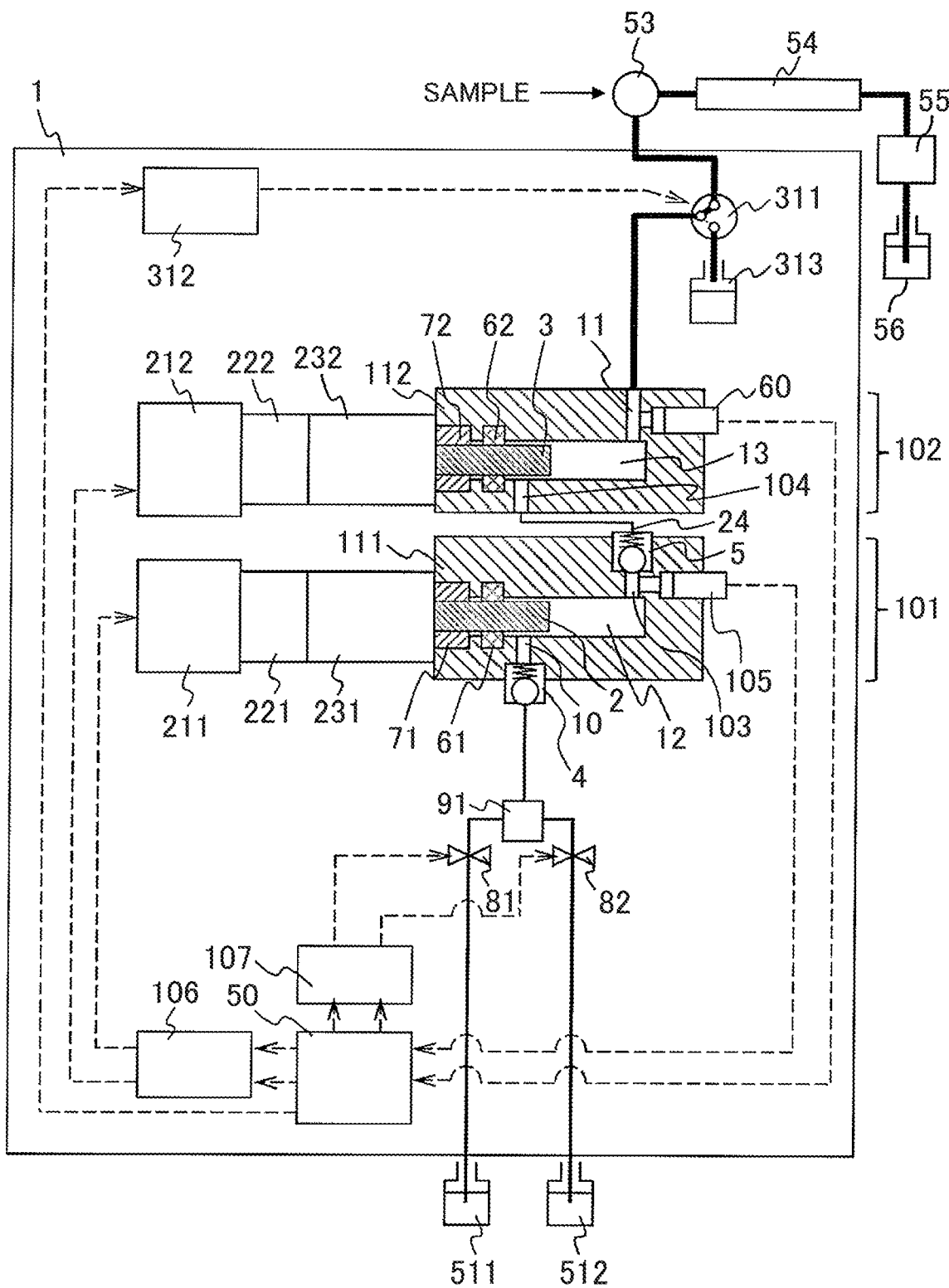
FIG. 1 shows an example of the configuration of a liquid feed pump 1 according to a first embodiment and a liquid chromatography device which uses the liquid feed pump 1.

FIG. 1 shows an example of the configuration of a liquid feed pump 1 according to the first embodiment of the present invention and a liquid chromatography device which uses the liquid feed pump 1. In FIG. 1, the liquid feed pump 1 includes, as main components, a first plunger pump 101, a second plunger pump 102, a first electromagnetic valve 81, a second electromagnetic valve 82, a purge valve 311, a controller 50, a motor driver 106, an electromagnetic valve driver 107, and a purge valve driver 312. The first plunger pump and the second plunger pump are connected in series.

The first plunger pump 101 includes a first pump head 111. The first pump head has a first suction path 10, a first discharge path 103, and a first pressure chamber 12. A first check valve 4 is located on the first suction path 10 and a second check valve 5 is located on the first discharge path 103 and these check valves restrict the direction in which the solvent flows. The second plunger pump 102 includes a second pump head 112. The second pump head 112 has a second suction path 104, a second discharge path 11, and a second pressure chamber 13. The second check valve 5 and the second suction path 104 are connected by a connection flow channel 24. In other words, the first plunger pump 101 and the second plunger pump 102 are connected in series and the first plunger pump 101 is located on the upstream side. The first plunger pump 101 holds the first plunger 2 as a pressurizing part by a bearing 71 in a slidable manner. The second plunger pump 102 holds the second plunger 3 as a pressurizing part by a bearing 72 in a slidable manner. A first seal 61 prevents liquid leakage from the first pressure chamber 12 and a second seal 62 prevents liquid leakage from the second pressure chamber 13.

The first suction path 10 is located on the lower limit point side of the first pressure chamber 12 and the second suction path 104 is located on the lower limit point side of the second pressure chamber 13. The first discharge path 103 is located on the upper limit point side of the first pressure chamber 12 and the second discharge path 11 is located on the upper limit point side of the second pressure chamber 13. The meanings of the lower limit point and upper limit point will be explained later.

The purge valve 311 is connected downstream of the second plunger pump 102. The purge valve 311 changes the direction of flow of the solvent discharged from the liquid feed pump 1 to either an injector 53 side or a drain tank 313 side.

The rotation of a first electric motor 211 is decelerated by a speed reduction device 221 and converted into a linear motion by a direct acting device 231 to move the first plunger 2 back and forth. The rotation of a second electric motor 212 is decelerated by a speed reduction device 222 and converted into a linear motion by a direct acting device 232 to move the second plunger 3 back and forth. Considering that the speed reduction device 221 and direct acting device 231 are combined to amplify the rotative power of the first electric motor 211 and convert it into linear motion power, they may be called a power transmission mechanism device in a broad sense. Concrete examples of the speed reduction devices 221 and 222 include a spur gear, pulley, epicyclic gear and worm gear. A major reason that the speed reduction devices are provided is to increase the electric motor torque and if an electric motor has a capability to generate a sufficient torque, they are not always needed. Concrete examples of the direct acting devices 231 and 232 are a ball screw, cam and rack pinion and so on. The structures of the speed reduction device and direct acting device are not limited in embodying the present invention.

When the first plunger pump 101 sucks a solvent, either the first electromagnetic valve 81 or the second electromagnetic valve 82 is open and the other valve is closed and either a first solvent 511 or a second solvent 512 is sucked. The solvent being sucked is passed through an interflow part 91, the first check valve 4, and the first suction path 10 and sucked into the first pressure chamber 12. The solvent sucked into the first pressure chamber 12 is compressed as the first plunger 2 ascends.

The "ascent" of the plunger represents movement in the direction in which the solvent in the pressure chamber is compressed or discharged (rightward movement in FIG. 1) and the "descent" represents the direction in which the solvent is sucked (leftward movement in FIG. 1). If the pressure of the compressed solvent is larger than the pressure in the second pressure chamber 13, the solvent flows through the first discharge path 103, second check valve 5, connection flow channel 24 and second suction path 104 into the second pressure chamber 13 and is discharged from the second discharge path 11.

A first pressure sensor 105 measures the pressure of the solvent in the first pressure chamber 12 and a second pressure sensor 160 measures the pressure of the solvent in the second pressure chamber 13.

The controller 50 gives a command value to the motor driver 106, electromagnetic valve driver 107, and purge valve driver 312 according to signals from the first pressure sensor 105 and second pressure sensor 60. The motor driver 106 gives driving electric power to the first electric motor 211 and second electric motor 212 according to the command value from the controller 50. The electromagnetic valve driver 107 gives driving electric power to the first electromagnetic valve 81 and second electromagnetic valve 82 according to the command value from the controller 50. The purge valve driver 312 gives driving electric power to the purge valve 311 according to the command value from the controller 50.

The solvent discharged from the liquid feed pump 1 is injected with a sample as the object of analysis by an injector 53. The solvent injected with the sample enters a separation column 54 and is separated into components. After that, a detector 55 detects the absorbance, fluorescent intensity, refraction index and so on according to each component of the sample. The separation column 54 is filled with microparticles and due to the fluid resistance produced as the solvent flows in gaps between microparticles, a load pressure of tens of megapascals to more than one hundred megapascals is generated in the liquid feed pump 1. The magnitude of the load pressure differs depending on the diameter of the separation column 54 and the flow rate.

When analysis using the first solvent 511 is changed to analysis using the second solvent 512, before analysis using the second solvent 512 the first electromagnetic valve 81 is changed from the open state to the closed state, and then the second electromagnetic valve 82 is changed from the closed state to the opens state. Consequently, inside the liquid feed pump 1 (first check valve 4, first suction path 10, first pressure chamber 12, first discharge path 103, connection flow channel 24, second suction path 104, second pressure chamber 13, second discharge path 11) and inside the injector 53, separation column 54, detector 55, and piping connecting them, the first solvent 511 is replaced by the second solvent 512. At this time, by shortening the time required to replace the solvent, the number of analyses which can be conducted in a given time can be increased.

Figure 2:
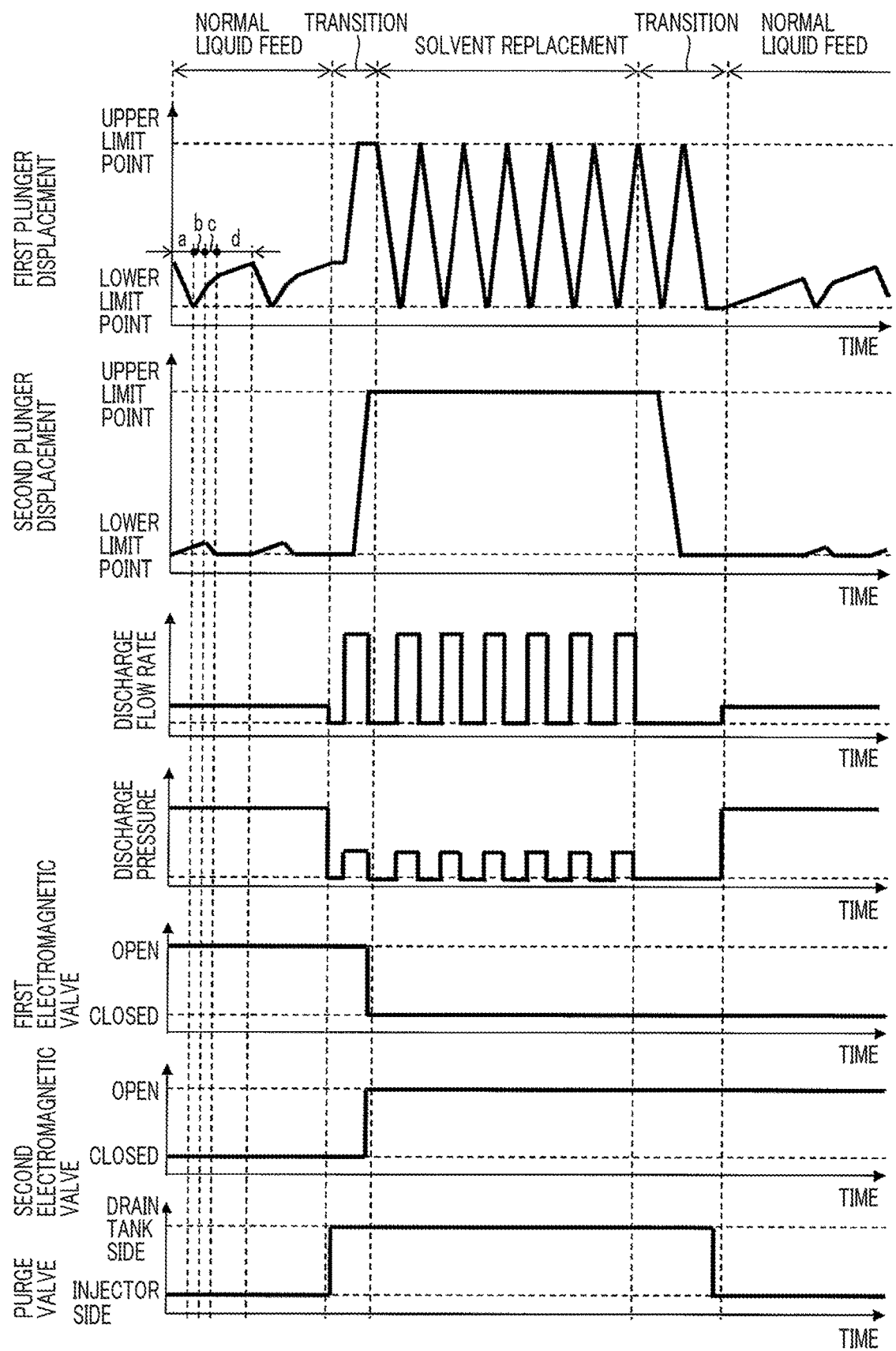
FIG. 2 is a diagram which illustrates the method of operation in which the liquid feed pump 1 replaces the solvent from a first solvent 511 to a second solvent 512.

FIG. 2 is a diagram which illustrates the method of operation in which the liquid feed pump 1 replaces the solvent from the first solvent 511 to the second solvent 512. Operation of the liquid feed pump 1 for solvent replacement includes the following steps: (a) normal liquid feed using the first solvent, (b) transition from normal liquid feed to solvent replacement, (c) solvent replacement liquid feed to replace the first solvent by the second solvent, (d) transition from solvent replacement to normal liquid feed, and (e) normal liquid feed after change to the second solvent. Normal liquid feed means a liquid feed method by which the solvent discharged from the liquid feed pump 1 is made to flow to the injector 53, separation column 54 and detector 55 and the sample is analyzed. The graphs in FIG. 2 are graphs which show changes over time in first plunger 2 displacement, second plunger 3 displacement, discharge flow rate, discharge pressure, the state of the first electromagnetic valve 81, the state of the second electromagnetic valve 82, and the state of the purge valve, in order from top to bottom. The discharge flow rate is the flow rate of discharge from the liquid feed pump 1 and the discharge pressure is the pressure detected by the second pressure sensor 60. It is here assumed that in terms of plunger displacement, the ascent direction (rightward in FIG. 1) is positive and the descent direction (leftward in FIG. 1) is negative and in terms of discharge flow rate, discharge is positive and suction is negative.

In the normal liquid feed step, the purge valve 311 is connected to the injector 53 side to let the solvent discharged from the liquid feed pump 1 flow to the injector 53, separation column 54 and detector 55. At this time, since pulsation of the discharge flow rate causes a decline in detection accuracy, the discharge flow rate must be constant. In zone a where the first plunger 2 descends and sucks the solvent, and zone b where the first plunger 2 ascends and compresses the solvent, the solvent is not discharged from the first pressure chamber 12 and thus the second plunger 3 ascends and discharges the solvent. After that, in zone c where the second plunger 3 descends and sucks the solvent, the first plunger 2 ascends and discharges the solvent to be sucked by the second plunger 3 and the solvent to be discharged to the pump downstream. After that, in zone d, the first plunger 2 ascends and discharges the solvent and the second plunger 3 stops. These motions keep the discharge flow rate from the liquid feed pump 1 constant. As the discharge flow rate is kept constant, the discharge pressure also becomes constant.

In the normal liquid feed step, the first plunger 2 and second plunger 3 both move with reference to the lower limit point. The lower limit point represents the lowest position in the range in which the plunger can move in the pressure chamber. On the other hand, the upper limit point, which will appear in the explanation given later, represents the highest position in the range in which the plunger can move in the pressure chamber. In contrast, the bottom dead point/top dead point generally mean the both ends of the plunger stroke. Therefore, as the stroke range changes, the bottom dead point and top dead point also change. In this specification, the lower limit point/upper limit point are used in a meaning different from the bottom dead point/top dead point unless otherwise described.

In FIG. 2, first, with the first electromagnetic valve 81 open, the second electromagnetic valve 82 closed, and the purge valve 311 connected to the injector 53 side, normal liquid feed is performed and the first solvent 511 is fed to the injector 53 side. In the transition step, under this condition, the first plunger 2 and the second plunger 3 are once stopped and the purge valve 311 is switched to the drain tank 313 side. Then, after the first plunger 2 ascends to the upper limit point, the second plunger 3 ascends to the upper limit point. Then, the first electromagnetic valve 81 is changed to the closed state and the second electromagnetic valve 82 is changed to the closed state. In the solvent replacement step, under this condition, while the second plunger 3 remains stopped, only the first plunger 2 reciprocates between the upper limit point and lower limit point so that the solvent in the liquid feed pump 1 is replaced from the first solvent 511 to the second solvent 512. At this time, the discharge flow rate is intermittent, thereby causing pressure pulsation. However, as compared with the fluid resistance in the separation column 54, the fluid resistance in the piping connecting the purge valve 311 and the drain tank 313 is small and thus the maximum pressure during solvent replacement is smaller than the pressure during normal liquid feed. In addition, since sample analysis is not conducted during solvent replacement and no solvent flows into the separation column 54 and detector 55, there is no problem even if pulsation of the flow rate and pressure occurs.

In the transition step from solvent replacement to normal analysis, the first plunger 2 and the second plunger 3 have to return to the lower limit point. First, the first plunger 2 moves to the lower limit point. Then, while the first plunger 2 is again moving to the upper limit point, the second plunger 3 moves to the lower limit point. At this time, if the second plunger 3 moves to the lower limit point while the first plunger remains stopped, the solvent would be sucked into the second pressure chamber 13 from the downstream side of the liquid feed pump 1. In order to prevent this, the first plunger 2 moves to the upper limit point. Then, the first plunger 2 again moves to the lower limit point. After that, the purge valve 311 is switched to the injector 53 side to start normal liquid feed.

Figure 3:
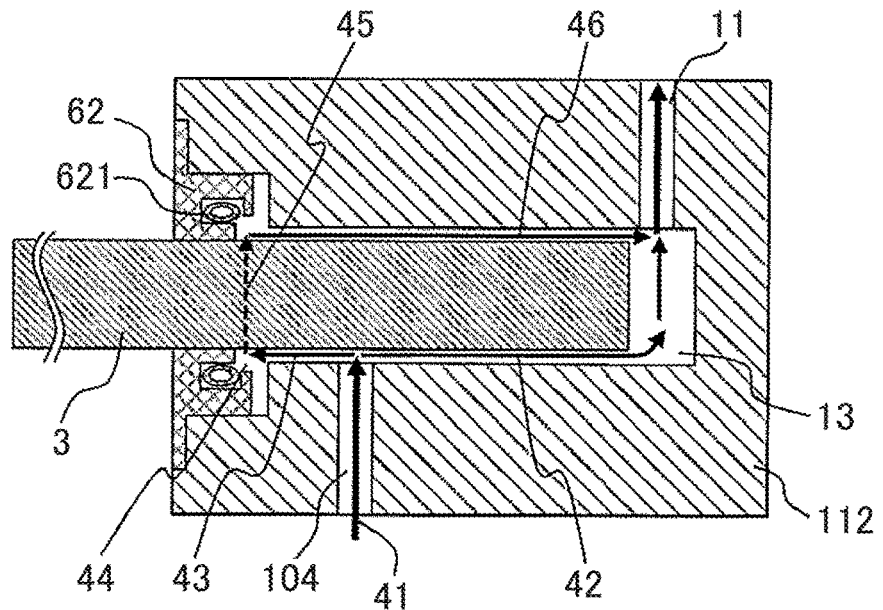
FIG. 3 is a diagram which schematically explains the flows and the solvent replacement generated in a second pressure chamber 13 with the ascent of a first plunger 2 in the solvent replacement process shown in FIG. 2.

FIG. 3 is a diagram which schematically explains the flows generated in the second pressure chamber 13 with the ascent of the first plunger 2 and the solvent replacement in the solvent replacement process shown in FIG. 2. For the convenience of description, the second pressure sensor 60 is omitted. When the first plunger 2 descends, the second check valve 5 is closed and no flow is generated in the second pressure chamber 13. A flow is generated in the second pressure chamber 13 only when the first plunger 2 ascends.

The second seal 62 has a spring 621 to fasten the second plunger 3 to let it have a pressure resistance (the first seal 61 also has one), though omitted in FIG. 1. The solvent is filled in a space 44 for the spring 621 and at the time of solvent replacement, the solvent in the space 44 must be replaced.

The flow of the solvent coming from the second suction path 104 is divided into a flow 42 passing through the gap between the second plunger 3 and the second pressure chamber 13 and going to the tip of the second pressure chamber 13 and a flow 43 going through the gap between the second plunger 3 and the second pressure chamber 13 to the seal vicinity space 44. The flow 43 going to the seal vicinity runs in the seal vicinity space 44 (flow 45) and then passes through the gap between the second plunger 3 and the second pressure chamber 13 (flow 46) and goes to the tip of the second pressure chamber 13. The flow 46 joins the flow 42 and flows out of the second pressure chamber 13 through the discharge path 11.

The second suction path 104 is located on the lower limit point side of the second pressure chamber 13. The second discharge path 11 is located on the upper limit point side of the second pressure chamber 13. In this structure, when the second plunger 3 is stopped near the upper limit point, the gap between the second plunger 3 and the second pressure chamber 13 is long in the longitudinal direction and the fluid resistance is large. Consequently, the combined fluid resistance of the flows 43, 45, and 46 becomes close to the fluid resistance of the flow 42, so the flow rate of the flow 43 becomes large. Consequently, the speed of solvent replacement in the seal vicinity space 44 is increased and the speed of solvent replacement in the entire second pressure chamber 13 is also increased.

Figure 4:
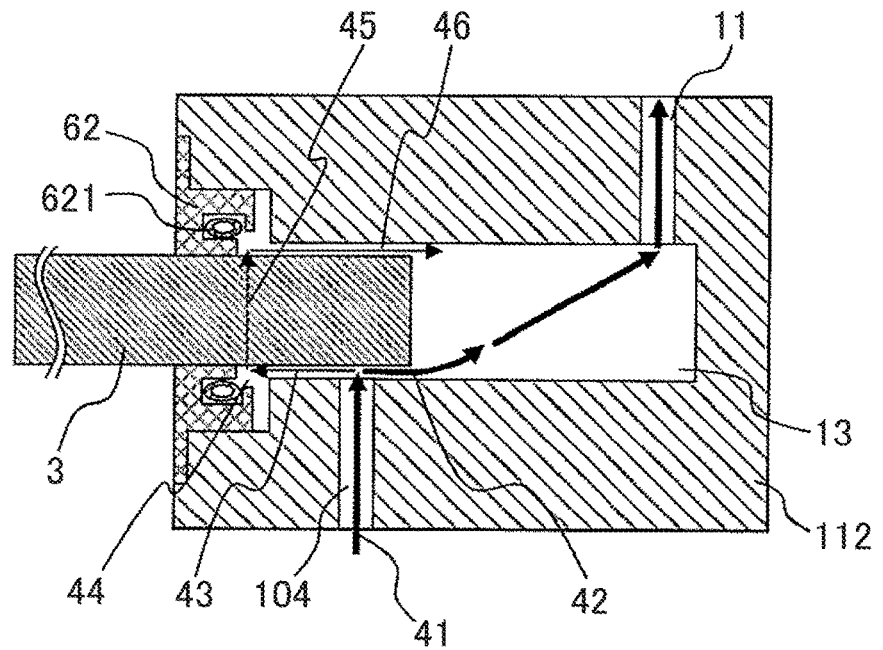
FIG. 4 is a diagram which schematically explains the flows when a second plunger 3 stops at the lower limit point.

FIG. 4 is a diagram which schematically explains the flows when the second plunger 3 stops at the lower limit point. When the second plunger 3 stops at the lower limit point, the distance from the outlet of the second suction path 104 to the space of the second pressure chamber 13 above the second plunger 3 is short, so the fluid resistance of the flow 42 is smaller than in the case of FIG. 3. Consequently, the flow rate of the flow 43 into the seal vicinity space 44 becomes small, so the solvent in the seal vicinity space 44 is hard to replace and the time of the solvent in the entire second pressure chamber 13 is slow.

Unlike the operation described referring to FIGS. 2 to 3, in the solvent replacement process, the solvent can also be replaced by reciprocating movement of the second plunger 3 between the upper limit point and lower limit point. This operation may be said to be an intermediate mode between the ones in FIG. 3 and FIG. 4. Therefore, solvent replacement is quicker than in FIG. 4 but slower than in FIG. 3 (which will be explained referring to FIG. 5). For this reason, the operation described referring to FIG. 2 to FIG. 3 can be said to be preferable.

Figure 5:
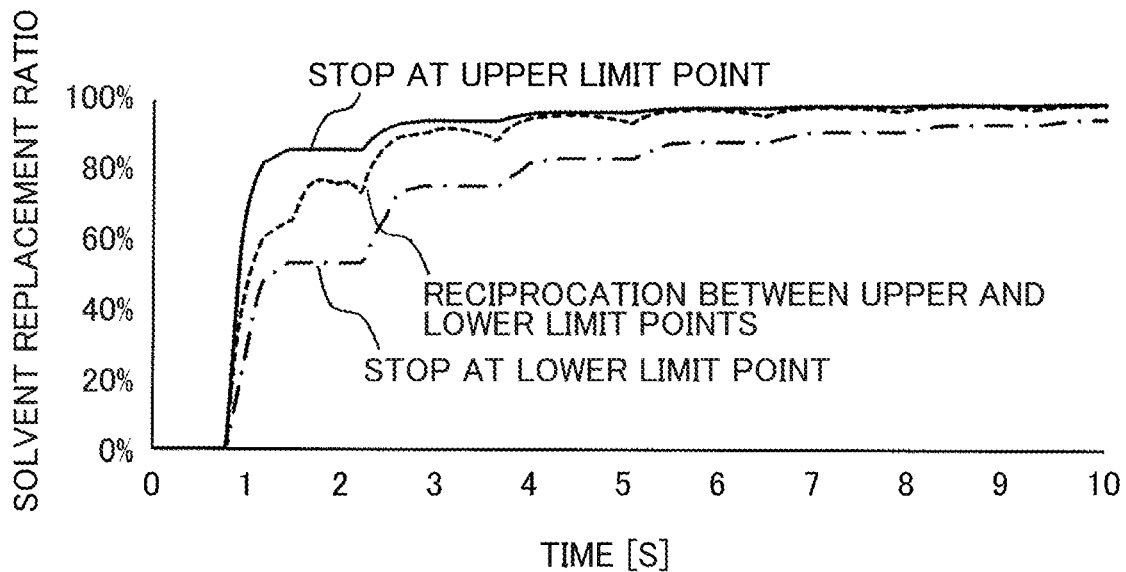
FIG. 5 shows the result of calculation of temporal change in the solvent replacement ratio in the second pressure chamber 13 in a fluid simulation.

FIG. 5 shows the result of calculation of temporal change in the solvent replacement ratio in the second pressure chamber 13 in a fluid simulation. The figure shows the solvent replacement ratio in the second pressure chamber 13 in the case that the second plunger 3 stops at the upper limit point (solid line), in the case that it stops at the lower limit point (broken line) and in the case that it reciprocates between the upper limit point and lower limit point (chain line). It is known from FIG. 5 that when the second plunger 3 stops at the upper limit point, the solvent can be replaced most quickly.

Figure 6:
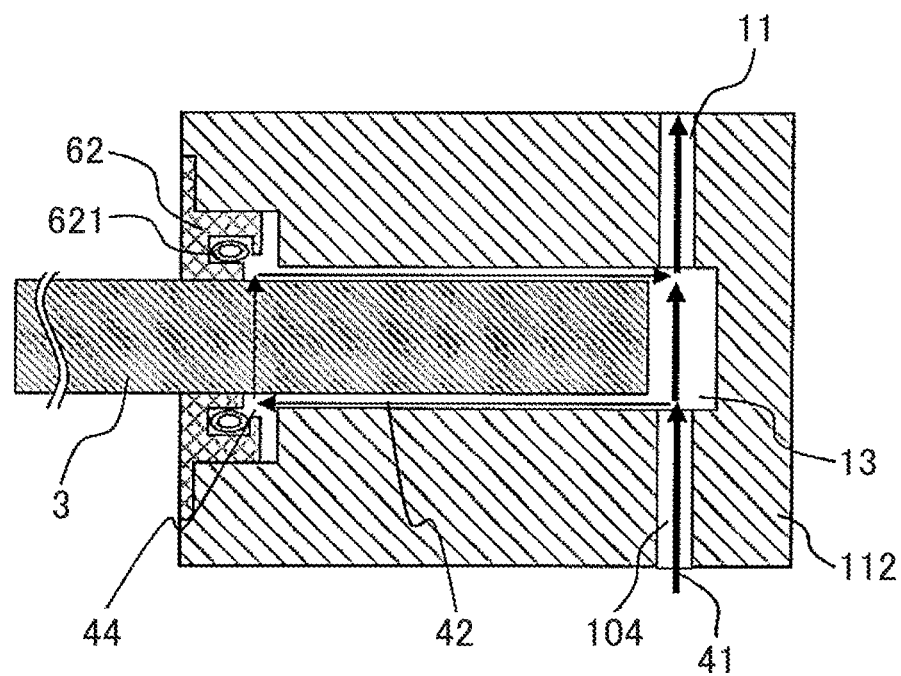
FIG. 6 is a diagram which schematically explains the flows and the solvent replacement generated in the second pressure chamber 13 when a second suction path 104 is located on the upper limit point side of the second pressure chamber 13 and a second discharge path 11 is located on the upper limit point side of the second pressure chamber 13.

FIG. 6 is a diagram which schematically explains the flows generated in the second pressure chamber 13 and the solvent replacement when the second suction path 104 is located on the upper limit point side of the second pressure chamber 13 and the second discharge path 11 is located on the upper limit point side of the second pressure chamber 13. In this structure, since the volumetric capacity of the tip of the second pressure chamber 13 is large, most of the flow of the solvent coming from the second suction path 104 passes through the tip of the second pressure chamber 13 and flows out through the second discharge path 11 and the flow rate of the flow 42 going from the gap between the second plunger 3 and the second pressure chamber 13 to the seal vicinity space 44 is small. Therefore, the solvent in the seal vicinity space 44 is hardly replaced. However, when the second plunger 3 is nearer to the upper limit point, the volumetric capacity of the tip of the second pressure chamber 13 is smaller and the flow rate of the flow 42 going to the seal vicinity space 44 is larger. Therefore, in the arrangement of the second suction path 104 and the second discharge path 11 as shown in FIG. 6 too, solvent replacement is made most quickly in the case that the second plunger 3 stops at the upper limit point.

Figure 7:
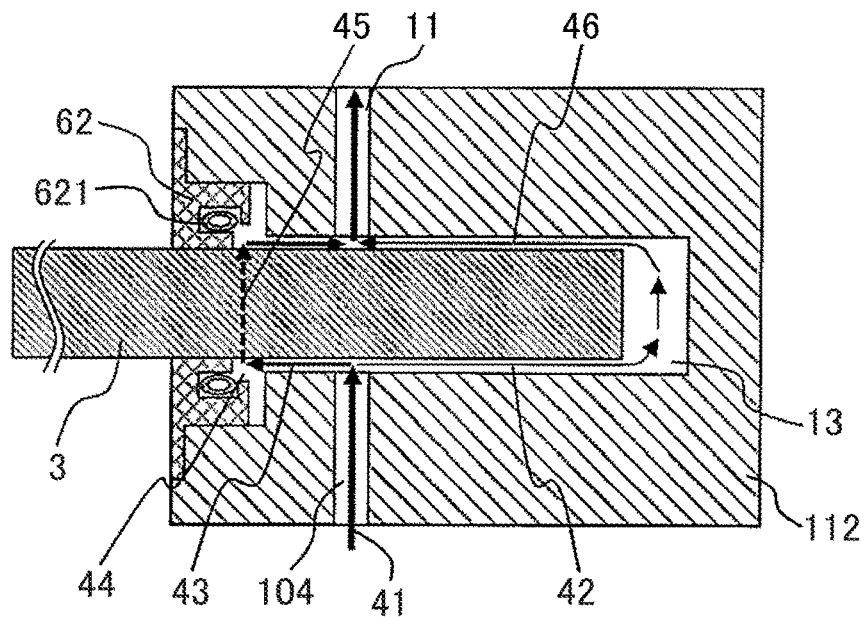
FIG. 7 is a diagram which schematically explains the flows and the solvent replacement generated in the second pressure chamber 13 when the second suction path 104 is located on the lower limit point side of the second pressure chamber 13 and the second discharge path 11 is located on the lower limit point side of the second pressure chamber 13.

FIG. 7 is a diagram which schematically explains the flows generated in the second pressure chamber 13 and the solvent replacement when the second suction path 104 is located on the lower limit point side of the second pressure chamber 13 and the second discharge path 11 is located on the lower limit point side of the second pressure chamber 13. In this structure, since the tip area of the second pressure chamber 13 is remotest from both the second suction path 104 and the second discharge path 11, the tip area of the second pressure chamber 13 becomes a stagnation area and virtually no flow is generated. However, when the second plunger 3 is nearer to the upper limit point, the volumetric capacity of the tip of the second pressure chamber 13 is smaller. Therefore, in the arrangement of the second suction path 104 and the second discharge path 11 as shown in FIG. 7 too, solvent replacement is made most quickly in the case that the second plunger 3 stops at the upper limit point.

Figure 8:
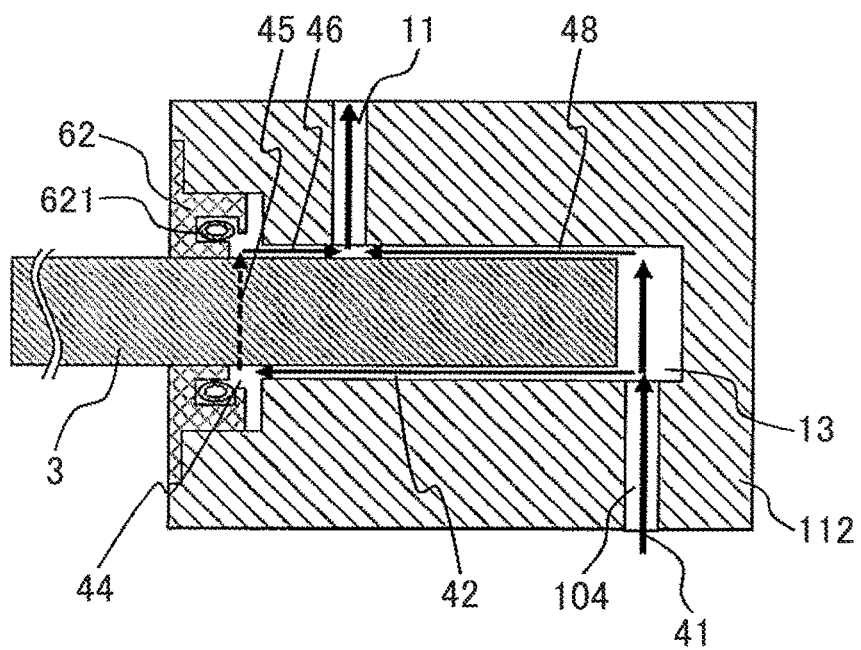
FIG. 8 is a diagram which schematically explains the flows and the solvent replacement generated in the second pressure chamber 13 when the second suction path 104 is located on the upper limit point side of the second pressure chamber 13 and the second discharge path 11 is located on the lower limit point side of the second pressure chamber 13.

FIG. 8 is a diagram which schematically explains the flows generated in the second pressure chamber 13 and the solvent replacement when the second suction path 104 is located on the upper limit point side of the second pressure chamber 13 and the second discharge path 11 is located on the lower limit point side of the second pressure chamber 13. In this structure, the flow of the solvent coming from the second suction path 104 is divided into a flow 48 passing through the tip of the second pressure chamber 13 and then going through the gap between the second plunger 3 and the second pressure chamber 13 to the discharge path 11, and a flow 42 going directly into the gap between the second plunger 3 and the second pressure chamber 13. After the flow 42 runs in the seal vicinity space 44 (flow 45), it passes through the gap between the second plunger 3 and the second pressure chamber 13 (flow 46) and goes to the second discharge path 11. When the second plunger 3 stops at the upper limit point, the gap between the second plunger 3 and the second pressure chamber 42 is long in the longitudinal direction and the fluid resistance is large. Consequently, since the combined fluid resistance of the flows 42, 45, and 46 is close to the fluid resistance of the flow 48, the flow rate of the flow 42 is large. Consequently, the solvent replacement in the seal vicinity space 44 is quick and the solvent replacement in the entire second pressure chamber 13 is also quick. Therefore, in the arrangement of the second suction path 104 and the second discharge path 11 as shown in FIG. 8 too, solvent replacement is made most quickly in the case that the second plunger 3 stops at the upper limit point.

First Embodiment: Conclusion

In the liquid feed pump 1 according to the first embodiment, at the time of solvent replacement, the second plunger 3 stops at the upper limit point (or its vicinity) and the first plunger 2 slides back and forth. Consequently, the solvent replacement speed can be higher than in the case that the second plunger 3 stops at the lower limit point (FIG. 4) and in the case the it reciprocates from the upper limit point to the lower limit point. This effect is the same regardless of whether the second suction path 104 and the second discharge path 11 are each located either on the upper limit point side or on the lower limit point side.

In the liquid feed pump 1 according to the first embodiment, the life of the second seal 62 is longer when the second plunger 3 is stopped at the time of solvent replacement, than when the second plunger 3 is moved. Furthermore, as explained later in connection with the third embodiment which will be described later, pressure loss on the suction side is smaller in the first plunger pump 101 than in the case that at the time of solvent replacement the first plunger 2 stops and only the second plunger 3 moves, so solvent cavitation hardly occurs.

Second Embodiment

Figure 9:
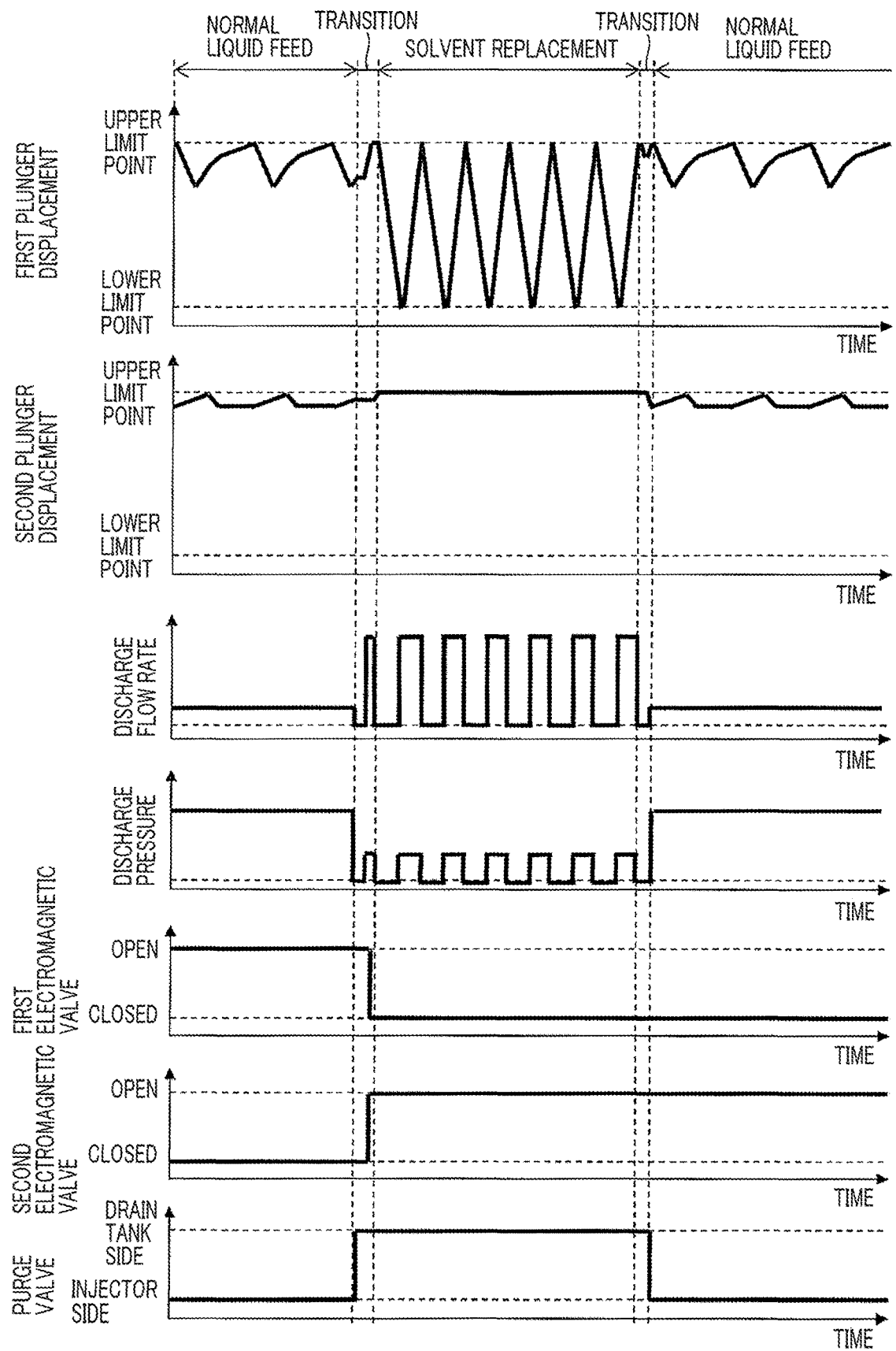
FIG. 9 is a diagram which illustrates the method of operation in which the liquid feed pump 1 according to a second embodiment replaces the solvent from the first solvent 511 to the second solvent 512.

FIG. 9 is a diagram which illustrates the method of operation in which the liquid feed pump 1 according to the second embodiment of the present invention replaces the solvent from the first solvent 511 to the second solvent 512. The configuration of the liquid feed pump 1 is the same as in the first embodiment. In the second embodiment, the normal liquid feed step is carried out with the upper limit point as a reference position. Next, using FIG. 9 an explanation will be made focusing on the different point from the first embodiment.

In the normal liquid feed step, the first plunger 2 and second plunger 3 both move with reference to the upper limit point. First, with the first electromagnetic valve 81 open, the second electromagnetic valve 82 closed, and the purge valve 311 connected to the injector 53 side, normal liquid feed is performed and the first solvent 511 is fed to the injector 53 side. In the transition step, under this condition, the first plunger 2 and the second plunger 3 are once stopped and the purge valve 311 is switched to the drain tank 313 side. Then, after the first plunger 2 ascends to the upper limit point, the second plunger 3 ascends to the upper limit point. After that, the first electromagnetic valve 81 is changed to the closed state and the second electromagnetic valve 82 is changed to the closed state. In the solvent replacement step, under this condition, while the second plunger 3 remains stopped, only the first plunger 2 reciprocates between the upper limit point and lower limit point so that the solvent in the liquid feed pump 1 is replaced from the first solvent 511 to the second solvent 512.

In the transition step from solvent replacement to normal analysis, first the first plunger 2 descends and then while the first plunger 2 is moving to the upper limit point again, the second plunger 3 descends for a required distance. After that, the purge valve 311 is switched to the injector 53 side to start normal liquid feed.

When the plunger is driven with reference to the upper limit point in the normal liquid feed step and then solvent replacement is made as shown in FIG. 9, the time for transition from the normal liquid feed step to the solvent replacement step (period of the transition step) is shorter than in normal liquid feed with reference to the lower limit point. This is because there is no need to move the plunger from the lower limit point to the upper limit point. Therefore, if the period of transition from normal liquid feed to solvent replacement is required to be shortened, operation as shown in FIG. 9 is advantageous.

Third Embodiment

Figure 10:
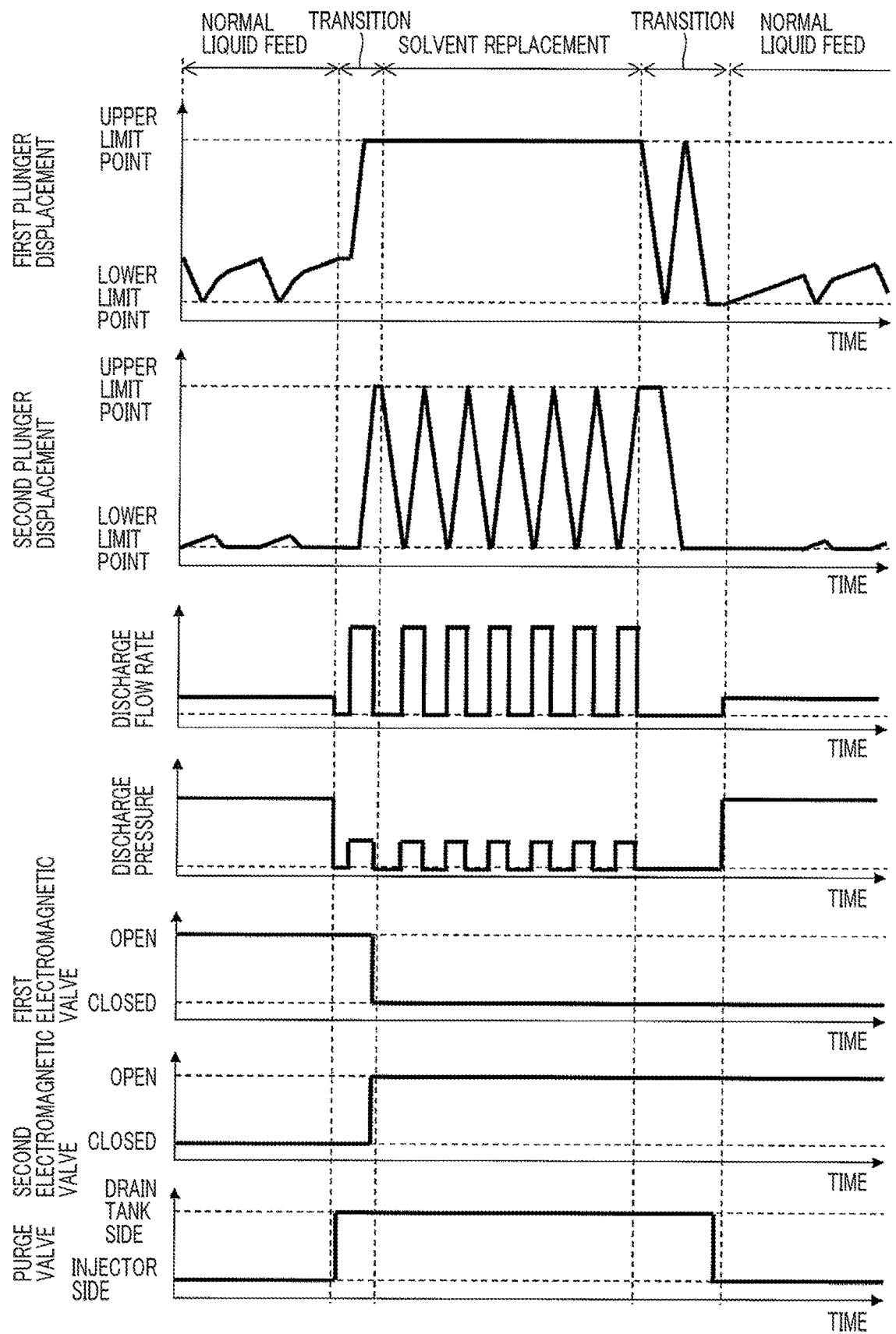
FIG. 10 is a diagram which illustrates the method of operation in which the liquid feed pump 1 according to a third embodiment replaces the solvent from the first solvent 511 to the second solvent 512.

FIG. 10 is a diagram which illustrates the method of operation in which the liquid feed pump 1 according to the third embodiment of the present invention replaces the solvent from the first solvent 511 to the second solvent 512. The configuration of the liquid feed pump 1 is the same as in the first embodiment. In the third embodiment, unlike the first embodiment, in the solvent replacement step, the first plunger 2 is stopped at the upper limit point and only the second plunger 3 is driven. Next, using FIG. 10 an explanation will be made focusing on the different point from the first embodiment.

In the method of operation as shown in FIG. 10, the transition step from normal liquid feed to solvent replacement and the transition step from solvent replacement to normal liquid feed are the same as in the first embodiment. In the solvent replacement step, the first plunger 2 remains stopped and only the second plunger 3 reciprocates between the upper limit point and lower limit point. Since the first plunger 2 remains stopped, the life of the first seal 61 is longer than in the first embodiment in which the first plunger 2 is driven.

Fourth Embodiment

Figure 11:
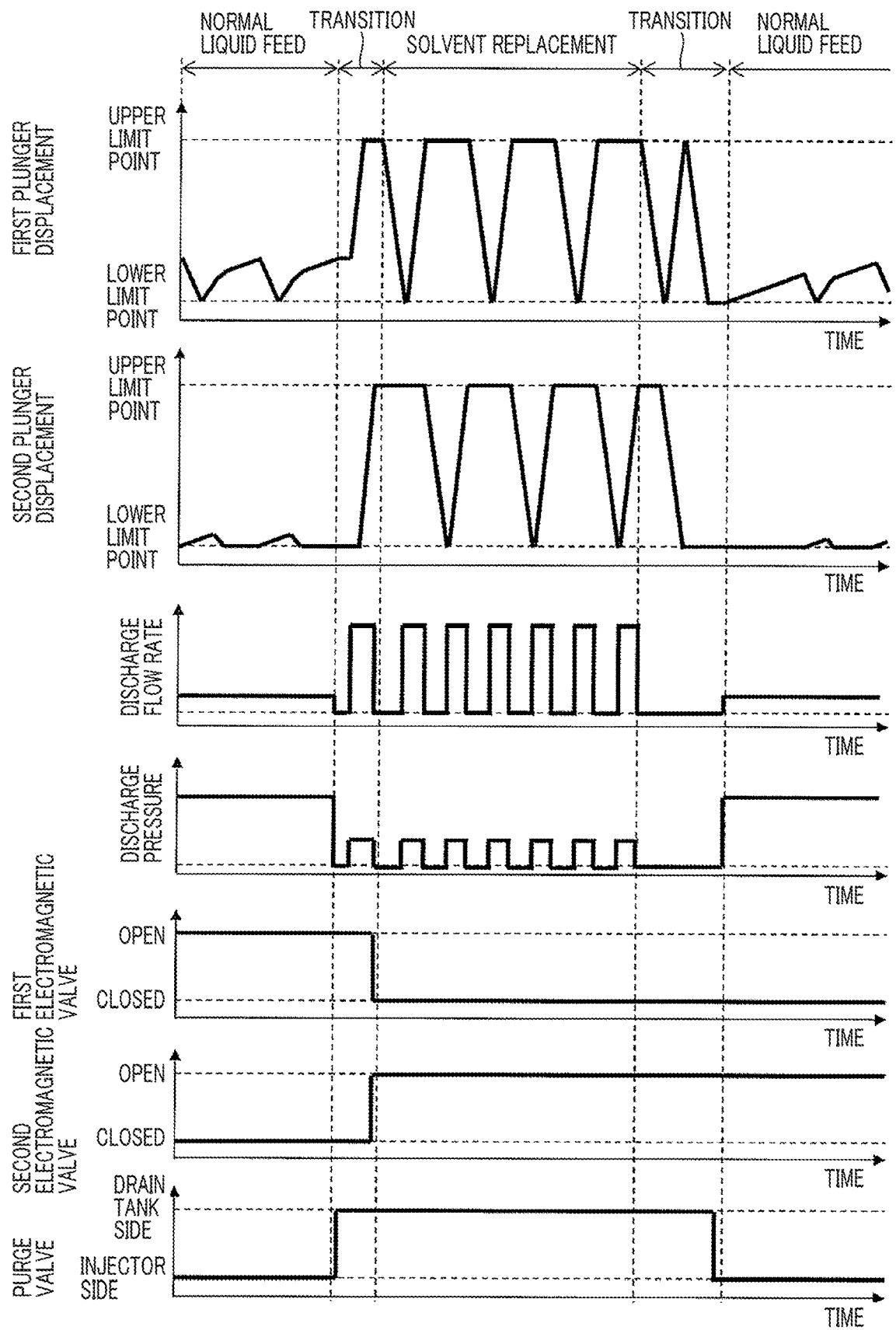
FIG. 11 is a diagram which illustrates the method of operation in which the liquid feed pump 1 according to a fourth embodiment replaces the solvent from the first solvent 511 to the second solvent 512.

FIG. 11 is a diagram which illustrates the method of operation in which the liquid feed pump 1 according to the fourth embodiment of the present invention replaces the solvent from the first solvent 511 to the second solvent 512. The configuration of the liquid feed pump 1 is the same as in the first embodiment. In the fourth embodiment, at the time of solvent replacement, reciprocating sliding motion of the first plunger 2 and reciprocating sliding motion of the second plunger 3 are performed alternately. Next, using FIG. 11 an explanation will be made focusing on the different point from the first embodiment.

In the method of operation as shown in FIG. 11, the transition step from normal liquid feed to solvent replacement and the transition step from solvent replacement to normal liquid feed are the same as in the first embodiment. In the solvent replacement step, first the first plunger 2 descends from the upper limit point to the lower limit point and then ascends to the upper limit point again. At this time, the second plunger 2 remains stopped at the upper limit point. Then, while the first plunger 2 remains stopped at the upper limit point, the second plunger 3 descends from the upper limit point to the lower limit point and then ascends to the upper limit point again. Reciprocating sliding motion of the first plunger 2 and reciprocating sliding motion of the second plunger 3 are repeated in this way to replace the solvent.

Operation as shown in FIG. 11 generates flows into the seal vicinity space as shown in FIG. 3 both in the first pressure chamber 12 and second pressure chamber 13 and in both the chambers the solvent can be replaced effectively. In addition, since the first plunger 2 and the second plunger 3 move for the same distance in the solvent replacement step, the load applied to the first seal 61 and the load applied to the second seal 62 are almost the same and thus the average seal life is longer than when only one of the plungers is driven as in the first to third embodiments.

FIG. 11 shows an example that the period of movement of the first plunger 2 and the period of movement of the second plunger 3 are switched after each reciprocation, but it is not always necessary to switch between the first plunger 2 and the second plunger 3 after each reciprocation. For example, switching may be done every two times of reciprocation or a modified mode of operation, for example, in which after the first plunger 2 reciprocates twice, the second plunger 3 reciprocates once, may be adopted. In other words, when one of the first plunger 2 and second plunger 3 reciprocates, the other should temporarily stop.

Fifth Embodiment

Figure 12:
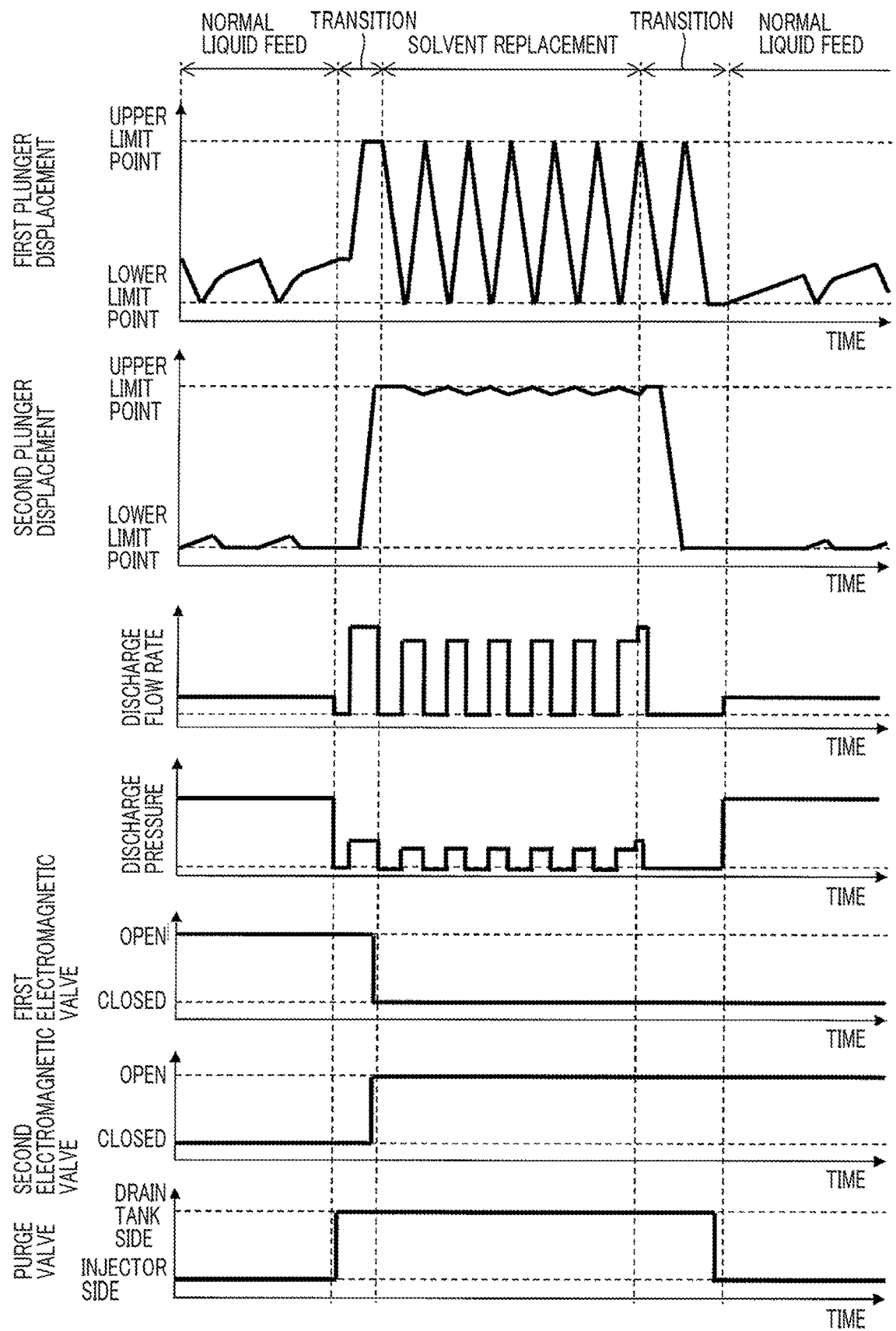
FIG. 12 is a diagram which illustrates the method of operation in which the liquid feed pump 1 according to a fifth embodiment replaces the solvent from the first solvent 511 to the second solvent 512.

FIG. 12 is a diagram which illustrates the method of operation in which the liquid feed pump 1 according to the fifth embodiment of the present invention replaces the solvent from the first solvent 511 to the second solvent 512. The configuration of the liquid feed pump 1 is the same as in the first embodiment. In the fifth embodiment, at the time of solvent replacement, the first plunger 2 reciprocates between the upper limit point and lower limit point and the second plunger 3 slightly moves in the opposite direction to movement of the first plunger 2 with reference to the upper limit point. Next, using FIG. 12 an explanation will be made focusing on the different point from the first embodiment.

In the method of operation as shown in FIG. 12, the transition step from normal liquid feed to solvent replacement and the transition step from solvent replacement to normal liquid feed are the same as in the first embodiment. In the solvent replacement step, first the first plunger 2 descends from the upper limit point to the lower limit point. Then, at the same time when the first plunger 2 ascends to the upper limit point again, the second plunger 3 slightly descends. After that, in conjunction with reciprocation of the first plunger 2 between the upper limit point and lower limit point, the second plunger 3 repeatedly ascends and descends in the opposite direction to movement of the first plunger 2. In the transition step from solvent replacement operation to normal analysis, first the first plunger 2 moves to the lower limit point and the second plunger 3 moves to the upper limit point. After that, as in the first embodiment, while the first plunger 2 is moving to the upper limit point again, the second plunger 3 moves to the lower limit point and then the first plunger 2 again moves to the lower limit point.

Figure 13:
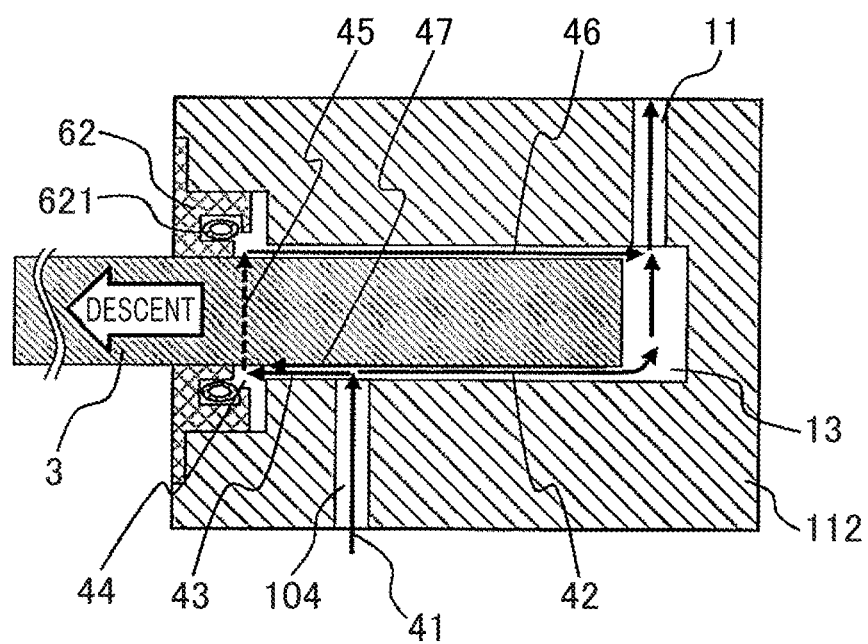
FIG. 13 is a diagram which schematically shows the flows in the second pressure chamber 13 with the descent of the second plunger 3 in the solvent replacement process when the first plunger 2 ascends.

FIG. 13 is a diagram which schematically shows the flows in the second pressure chamber 13 with the descent of the second plunger 3 in the solvent replacement process when the first plunger 2 ascends. As the second plunger 3 descends, a flow 47 which pulls the solvent toward the second seal 62 is generated. At this time, as the descent of the second plunger 3 makes the gap between the second plunger 3 and the second pressure chamber 13 longer, when the effect that the flow 47 joins the flow 43 is relatively larger than the effect that the flow toward the direction of the flow 42 becomes easier, the flow 43 into the seal vicinity space 43 becomes larger. Consequently, solvent replacement in the entire second pressure chamber 13 becomes quicker.

As for the motions of the first plunger 2 and second plunger 3 as shown in FIG. 12, their respective roles may be reversed (the first plunger 2 slightly moves with reference to the upper limit point and the second plunger 3 reciprocates between the upper limit point and lower limit point) or their roles may be changed alternately every reciprocation or every several times of reciprocation.

Sixth Embodiment

Figure 14:
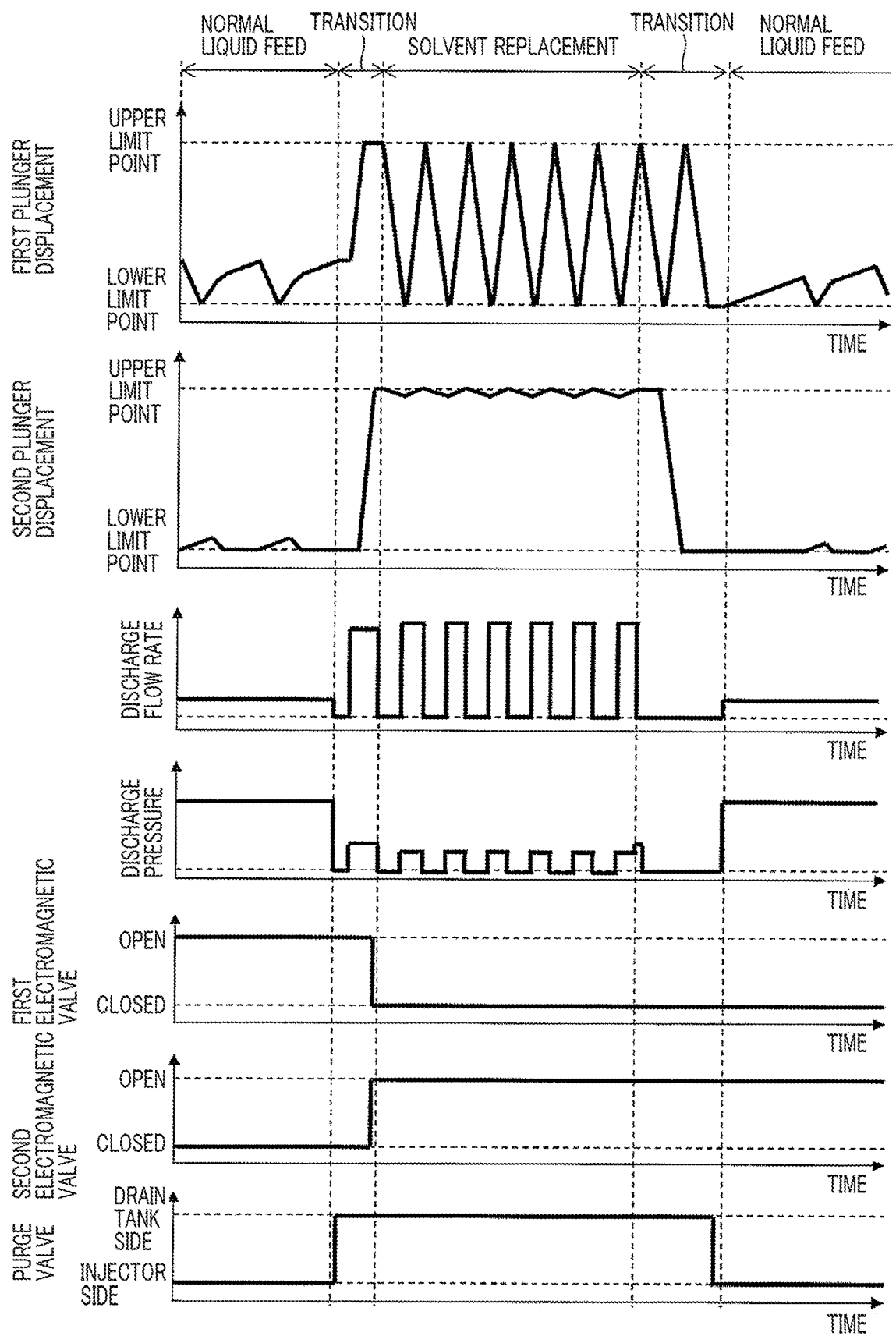
FIG. 14 is a diagram which illustrates the method of operation in which the liquid feed pump 1 according to a sixth embodiment replaces the solvent from the first solvent 511 to the second solvent 512.

FIG. 14 is a diagram which illustrates the method of operation in which the liquid feed pump 1 according to the sixth embodiment of the present invention replaces the solvent from the first solvent 511 to the second solvent 512. The configuration of the liquid feed pump 1 is the same as in the first embodiment. In the sixth embodiment, at the time of solvent replacement, the first plunger 2 reciprocates between the upper limit point and lower limit point and the second plunger 3 slightly moves in the same direction as the first plunger 2 with reference to the upper limit point. Next, using FIG. 14 an explanation will be made focusing on the different point from the first embodiment.

In the method of operation as shown in FIG. 14, the transition step from normal liquid feed to solvent replacement and the transition step from solvent replacement to normal liquid feed are the same as in the first embodiment. In the solvent replacement step, at the same time when the first plunger 2 descends from the upper limit point to the lower limit point, the second plunger 3 slightly descends. After that, at the same time when the first plunger 2 ascends toward the upper limit point, the second plunger 3 ascends to the upper limit point. Then, in conjunction with reciprocation of the first plunger 2 between the upper limit point and lower limit point, the second plunger 3 repeatedly ascends and descends in the same direction as the first plunger 2. The other points are the same as in the fifth embodiment.

Figure 15:
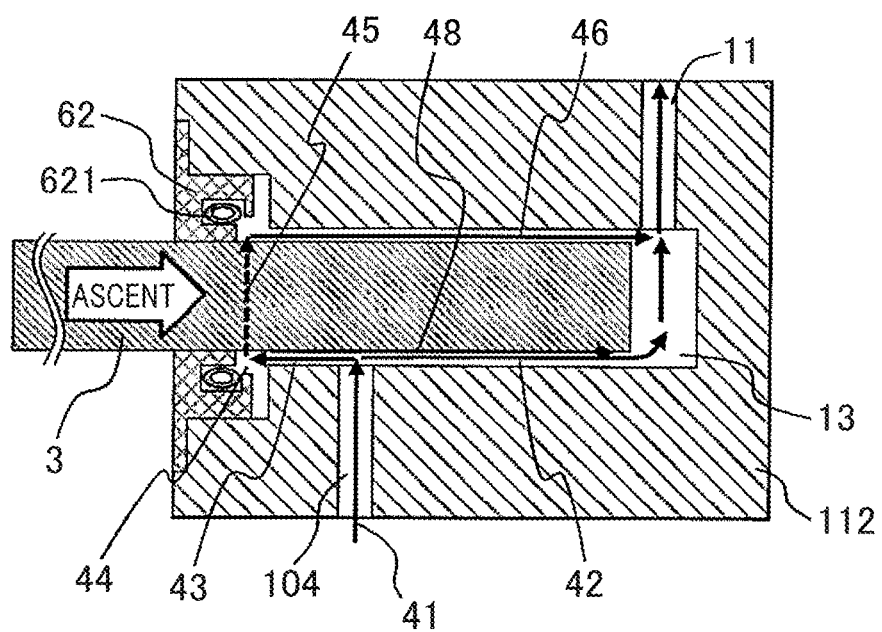
FIG. 15 is a diagram which schematically shows the flows in the second pressure chamber 13 with the ascent of the second plunger 3 in the solvent replacement process when the first plunger 2 ascends.

FIG. 15 is a diagram which schematically shows the flows in the second pressure chamber 13 with the ascent of the second plunger 3 in the solvent replacement process when the first plunger 2 ascends. The ascent of the second plunger 3 generates a flow 48 which pulls the solvent toward the tip of the second pressure chamber 13. Consequently, the flow 42 becomes larger and the flow going toward the tip area of the second pressure chamber 13 in the stagnation area becomes larger so that the solvent replacement in the entire second pressure chamber 13 becomes quicker.

As for the motions of the first plunger 2 and second plunger 3 as shown in FIG. 14, their respective roles may be reversed (the first plunger 2 slightly moves with reference to the upper limit point and the second plunger 3 reciprocates between the upper limit point and lower limit point) or their roles may be changed alternately every reciprocation or every several times of reciprocation.

Variations of the Present Invention

The present invention is not limited to the above embodiments but includes various variations. For example, the above embodiments have been described in detail for easy understanding of the present invention; however the present invention is not limited to a structure which includes all the elements described above. An element of an embodiment may be replaced by an element of another embodiment or an element of another embodiment may be added to the elements of an embodiment. For some of the elements of each embodiment, addition of another element, deletion, or replacement can be made.

As a derivation from the abovementioned embodiments, the zone in which the plunger reciprocates need not be strictly between the upper limit point and lower limit point and the position at which the plunger stops need not be the upper limit point. For example, in the first embodiment, if the first plunger 2 moves with reference to below the upper limit point to replace the solvent, the time of transition from normal liquid feed to solvent replacement is shorter. Similarly, if the position at which the second plunger 3 stops is below the upper limit point, the time of transition from normal liquid feed to solvent replacement is shorter. If the time assigned to solvent replacement is fixed, the solvent replacement ratio may be increased by shortening the transition time using such a drive method to replace the solvent.

In the configuration of the liquid feed pump 1 in FIG. 1, the shapes of the elements of the first plunger pump 101 and those of the second plunger pump 102 need not be the same. For example, the outside diameter of the second plunger 3 may be smaller than the outside diameter of the first plunger. In addition, the depth of the second pressure chamber 13 (maximum stroke of the second plunger 3) may be shorter than the depth of the first pressure chamber 12. The method of operation should be selected appropriately according to various parameters related to the pump shape, including the inside diameter and length of the cylinder, the volumetric capacity of the seal portion and the volumetric capacity of the tip stagnation area, so that solvent replacement is shortest.

In the above embodiments, as the mechanism to change the solvent to be introduced into the liquid feed pump 1, the first electromagnetic valve 81 and second electromagnetic valve 82 are given as an example, but any other appropriate mechanism may be used to change the solvent.

The relative merits and demerits of the effect of the solvent replacement described in each embodiment differ depending on the liquidity of the solvent to be introduced. Therefore, by appropriately selecting the method of operation according to each embodiment depending on the type of solvent, the time required for solvent replacement can be shortened.

LIST OF REFERENCE SIGNS

1: liquid feed pump
2: first plunger
3: second plunger
4: first check valve
5: second check valve
10: first suction path
11: second discharge path
12: first pressure chamber
13: second pressure chamber
50: controller
53: injector
54: separation column
55: detector

What is claimed is:

1. A liquid feed pump which sucks or discharges a liquid, comprising:
a first plunger pump which sucks or discharges the liquid by sliding of a first plunger;
a second plunger pump which sucks or discharges the liquid by sliding of a second plunger; and
a liquid replacement mechanism which replaces the liquid to be introduced into the liquid feed pump, wherein
the first plunger pump and the second plunger pump are connected in series in a channel in which the liquid moves,
the first plunger is structured to be able to move between a first lower limit point and a first upper limit point in the first plunger pump,
the second plunger is structured to be able to move between a second lower limit point and a second upper limit point in the second plunger pump,
in the second plunger pump, a second plunger seal for sealing between a main body of the second plunger pump and the second plunger is located at a position nearer to the second lower limit point than to the second upper limit point,
when the liquid in the liquid feed pump is replaced, the first plunger slides back and forth in a space between the first lower limit point and the first upper limit point, and
when the liquid in the liquid feed pump is replaced, the second plunger stops at least temporarily at a position nearer to the second upper limit point than to the second lower limit point or slides back and forth for a shorter distance than when the liquid feed pump sucks and discharges the liquid.

2. The liquid feed pump according to claim 1, wherein
when the liquid in the liquid feed pump is replaced, the first plunger slides back and forth once in the space between the first lower limit point and the first upper limit point and then stops temporarily,
when the liquid in the liquid feed pump is replaced, while the first plunger slides back and forth in the space between the first lower limit point and the first upper limit point, the second plunger stops temporarily and while the first plunger stops temporarily, the second plunger slides back and forth between a space between the second lower limit point and the second upper limit point.

3. The liquid feed pump according to claim 1, wherein when the liquid in the liquid feed pump is replaced, in a period in which the first plunger makes a sucking motion, the second plunger makes a discharging motion and in a period in which the first plunger makes the discharging motion, the second plunger makes the sucking motion.

4. The liquid feed pump according to claim 1, wherein when the liquid in the liquid feed pump is replaced, in a period in which the first plunger makes a sucking motion, the second plunger makes the sucking motion and in a period in which the first plunger makes a discharging motion, the second plunger makes the discharging motion.

5. The liquid feed pump according to claim 1, further comprising:
   a suction path which introduces the liquid into the second plunger pump; and
   a discharge path which discharges the liquid from the second plunger pump, wherein
   a distance between the discharge path and the second lower limit point is larger than a distance between the suction path and the second lower limit point.

6. The liquid feed pump according to claim 1, further comprising:
   a suction path which introduces the liquid into the second plunger pump; and
   a discharge path which discharges the liquid from the second plunger pump, wherein
   a distance between the discharge path and the second lower limit point is equal to a distance between the suction path and the second lower limit point.

7. The liquid feed pump according to claim 6, wherein the suction path and the discharge path are located at a position nearer to the second lower limit point than to the second upper limit point.

8. The liquid feed pump according to claim 1, further comprising:
   a suction path which introduces the liquid into the second plunger pump; and
   a discharge path which discharges the liquid from the second plunger pump, wherein
   a distance between the discharge path and the second lower limit point is smaller than a distance between the suction path and the second lower limit point.

9. The liquid feed pump according to claim 1, wherein
   when the liquid feed pump sucks and discharges the liquid, the first plunger pump slides back and forth between the first lower limit point and a position nearer to the first upper limit point than to the first lower limit point, and
   when the liquid feed pump sucks and discharges the liquid, the second plunger pump slides back and forth between the second lower limit point and a position nearer to the second upper limit point than to the second lower limit point.

10. The liquid feed pump according to claim 1, wherein
    when the liquid feed pump sucks and discharges the liquid, the first plunger pump slides back and forth between the first upper limit point and a position nearer to the first lower limit point than to the first upper limit point, and
    when the liquid feed pump sucks and discharges the liquid, the second plunger pump slides back and forth between the second upper limit point and a position nearer to the second lower limit point than to the second upper limit point.

11. The liquid feed pump according to claim 1, wherein
    the first plunger pump is connected to the liquid replacement mechanism, and
    the second plunger pump discharges the liquid out of the liquid feed pump.

12. A liquid chromatography device comprising a liquid feed pump according to claim 1.

* * * * *